(12) United States Patent
Bektasevic et al.

(10) Patent No.: US 11,866,271 B2
(45) Date of Patent: Jan. 9, 2024

(54) GRIPPER FOR A CONTAINER TRANSPORT SYSTEM

(71) Applicant: KHS GmbH, Dortmund (DE)

(72) Inventors: Damir Bektasevic, Wiesbaden (DE); Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 799 days.

(21) Appl. No.: 16/971,130

(22) PCT Filed: Jan. 3, 2019

(86) PCT No.: PCT/EP2019/050099
§ 371 (c)(1),
(2) Date: Aug. 19, 2020

(87) PCT Pub. No.: WO2019/161979
PCT Pub. Date: Aug. 29, 2019

(65) Prior Publication Data
US 2021/0094765 A1    Apr. 1, 2021

(30) Foreign Application Priority Data
Feb. 23, 2018  (DE) .......................... 102018104112.8

(51) Int. Cl.
*B65G 47/86*    (2006.01)
(52) U.S. Cl.
CPC .... *B65G 47/847* (2013.01); *B65G 2201/0244* (2013.01)
(58) Field of Classification Search
CPC ................ B65G 47/847; B65G 47/905; B65G 2201/0244; B25J 15/0226; B67C 3/246

USPC ............................ 294/116; 198/803.7, 803.9
See application file for complete search history.

(56) References Cited

U.S. PATENT DOCUMENTS

| 4,651,879 | A | | 3/1987 | Harris et al. | |
| 5,308,582 | A | * | 5/1994 | Serra .................. | A61M 5/3213 269/239 |
| 5,893,700 | A | * | 4/1999 | Kronseder ............... | B67C 3/24 414/744.2 |
| 8,672,376 | B1 | * | 3/2014 | Wilson ................. | B65G 47/847 294/99.1 |
| 8,833,824 | B2 | * | 9/2014 | Fahldieck ............ | B65G 47/847 198/470.1 |
| 9,022,442 | B2 | * | 5/2015 | Rousseau ............. | B25J 15/0028 294/90 |

(Continued)

FOREIGN PATENT DOCUMENTS

| CN | 1140693 A | 1/1997 |
| CN | 101164845 A | 4/2008 |
| CN | 101306760 A | 11/2008 |

(Continued)

*Primary Examiner* — Dean J Kramer
(74) *Attorney, Agent, or Firm* — Occhiuti & Rohlicek LLP

(57) ABSTRACT

A gripper for a container-transporter includes a system, first and second arms with corresponding inner faces and a controller disposed between the arms to pivot the arms. A spring pre-loads the arms towards one another. Rollers at the control unit rotate about a central control-axis thereof. The faces are shaped such that, in response to the rollers' movement, they carry out an equiangular and symmetric pivoting between an opened and closed position of the gripper.

18 Claims, 5 Drawing Sheets

(56) References Cited

U.S. PATENT DOCUMENTS 9,102,479 B2 *   8/2015   Schulnig ............. B29C 45/0053

FOREIGN PATENT DOCUMENTS

| | | | | |
|---|---|---|---|---|
| CN | 101357745 A | 2/2009 | | |
| CN | 104003185 A | 8/2014 | | |
| DE | 19542518 A1 | 11/1996 | | |
| DE | 19542337 A1 | 5/1997 | | |
| DE | 29802011 U1 | 5/1998 | | |
| DE | 20305988 U1 * | 7/2003 | ........... | B65G 47/847 |
| EP | 1930259 A1 | 6/2008 | | |
| EP | 2159172 A1 | 3/2010 | | |
| EP | 2774876 A1 * | 9/2014 | ........... | B65G 47/847 |
| EP | 3165482 A1 | 5/2017 | | |
| WO | 2017080644 A2 | 5/2017 | | |

* cited by examiner

GRIPPER FOR A CONTAINER TRANSPORT SYSTEM

RELATED APPLICATIONS

This application is the national stage of international application PCT/EP2019/050099, which was filed on Jan. 3, 2019 and which claims the benefit of the Feb. 23, 2018 priority date of German application DE 102018104112.8, the contents of both of which are incorporated herein by reference.

FIELD OF INVENTION

The invention relates to a gripper for a container transport system.

BACKGROUND

When transporting containers in the course of mass-production of packaged goods, particularly foods, it is often necessary to transport containers from one place to another. This typically involves the use of a gripper to grip the container during transport thereof. These grippers are typically mounted on the periphery of a transport star.

Grippers are complex mechanical devices that are expensive to produce. They are also prone to defects and malfunctions. In addition, known grippers do not close uniformly. This can result in a container being displaced slightly when gripped. For cases in which the container is open and filled with liquid, this can lead to spillage, particularly as a result of centrifugal forces encountered during transport on a rotating star.

SUMMARY

In one aspect, a gripper for transport of individual standing container includes a pair of gripper arms and a control unit. The gripper arms are arranged such that they can pivot towards one another. The control unit, or "controller," rotates for pivoting the gripper arms. The controller is arranged between the gripper arms. A spring preloads the gripper arms towards each other.

In another aspect, the invention features a transport device for containers with a plurality of grippers, each of which has the features of the above-mentioned gripper. A suitable transport device is a transport star.

In yet another aspect, the invention features a method of using the foregoing gripper to grip a container. The invention finally also relates to a method for gripping a container by a gripper.

The gripper is used in a container transport system for the transport of individual standing containers. Such a gripper includes two gripper arms that are arranged such that they can pivot towards one another and a rotatable controller for pivoting the gripper arms. The controller is arranged between the gripper arms. A spring element preloads the two gripper arms towards each other or into a closed position of the gripper arms. Arranged at the controller are at least two control rollers that pivot and/or rotate about a control axis. Each gripper arm has an inner control face. The rollers that the controller uses for pivoting the gripper arms are guided so as to slide and/or roll on a control face of a gripper arm and to cooperate with the force exerted by the spring to open or close the gripper.

The interaction of the control rollers of the controller with the control faces of the gripper arms makes it possible to achieve precise control of the gripping action in a simple way. As a result of its mechanically simple form, the gripper is economical to manufacture and the risk of malfunction due to technical defects is low.

The use of a control curve also enables a synchronized closing of the gripper's arms in a continuous and uniform manner. As a result, it is possible to grip a container filled without liquid without shaking it so much as to spill liquid.

A particular advantage is the fact that the grippers are not coupled by either a positive-fitting or non-positive fitting element, such as a toothed arrangement. They are also not drive in a mutually opposed manner. Accordingly, an individual gripper arm and its control faces respectively can be raised on one side by the control rollers of the controller with very substantial forces in the circumferential direction or in the transport direction respectively.

The method according to the invention for gripping a container by a gripper, which comprises two gripper arms, arranged such as to be rotatable towards one another, at least one spring element for preloading one of the two gripper arms onto the other, and a rotatable controller, arranged between the gripper arms, for pivoting the gripper arms, wherein at each of the gripper arms at least one control face is provided, on which a control roller is guided, sliding and/or rolling, which can be pivoted and/or rotated about a control axis of the controller, then comprises as method steps, starting from a closed position of the gripper arms, first a rotation of the control axis by a quarter of a revolution, wherein the at least two control rollers roll on a control face, and bring the gripper arms against the force of the spring element into an opened position, followed by the taking up of a container into a holding region between the two gripper arms, and, finally, a rotation of the control axis again by a quarter of a revolution, into the same or the opposite direction, wherein the at least two control rollers roll on a control face, and the gripper arms are guided by the control rollers, and are brought into a closed position by the force of the spring element. The renewed opening of the gripper arms is put into effect by a further rotation of the control axis by a quarter of a rotation. In this situation, the device is preferably formed in such a way that an opening and closing of the gripper arms takes place at every rotation of the control axis by 90°, regardless of the direction of rotation, such that, by continuous rotation in one direction, the gripper arms can be brought alternately into the open and into the closed position.

A gripper is a device or module that, when actuated, for example by pivoting at least one component thereof, will pick up and hold a container using a positive fit or a non-positive fit. In some embodiments, the gripper is configured for radial gripping in relation to an axis of a container to be gripped or in relation to an axis about which the gripper arms pivot.

In some embodiments, the gripper is provided for individual container transport, in particular of upright containers.

In other embodiments, the transport takes place only in one plane.

In still other embodiments, the container does not rotate in relation to the gripper and/or is not moved in a third spatial direction.

Embodiments further include those in which the gripper is a gripper for gripping glass containers and those in which it is a container belly gripper.

A "container" is an object with an inner volume for holding a material and with an opening for filling and emptying. Preferably, the container is one for holding liquids such as beverages. A container can also hold a food, Examples of containers include glass or plastic bottles, including screw-top glass containers, composite cardboard packaging elements, cans, or tubes. Preferably, the containers for receiving liquids are containers provided with a closure, such as a screw closure, on the top side of the container when the container is in its normal standing position of the container.

In some embodiments, the gripper transports individual bottles.

The arms are the components of the gripper that, by a movement relative to one another, are brought into contact, indirectly or directly, on a surface of the container that is to be gripped. For this purpose, the arms are capable of being pivoted at least inside a holding region for holding the container, in an overall arrangement preferably onto one another. In some embodiments, the two arms of a gripper or of a pair of arms pivot in a common plane. In such embodiments, at least two, and in some embodiments, precisely two arms, are arranged opposite one another, form a gripper or a pair of arms of a gripper.

In some embodiments, each of the arms includes a hole to receive a gripper arm axis. Among these are embodiment in which the arm is secured to the further component of the gripper. This provides a pivotable arrangement of the gripper arm on a further component of the gripper.

Embodiments further include those in which each of the arms is formed as an individual component, in particular as a single piece and those in which it is a module formed from several components.

The gripper arm can be formed from any desired material. Examples include metal, plastic, and composite material.

In some embodiments, the gripper arm is configured as essentially straight. But in other embodiments, the arm can be curved. This depends in part on the container's shape. In some embodiments, the arm is curved, in particular in a direction between the pivotable securing position, and the holding region or a holding surface for gripping the container. In some embodiments, both arms are formed and/or arranged with mirror symmetry relative to each other.

Each of the arms preferably includes a holding region in which a container that is to be transported or gripped comes into contact with the gripper arm.

The holding region is preferably at a distal end of the arm. In some embodiments, the holding region comprises a holding surface having a section for contacting the container that is to be gripped. Among the embodiments are those in which the holding surface is arranged on the surface facing towards the other gripper arm of the gripper. The holding surface of a gripper arm is preferably curved with a radius-of-curvature. In alternative embodiments, the holding surface includes different sections with different radii-of-curvature.

In some embodiments, the radius-of-curvature is uniform. However, in other embodiments, the radius-of-curvature is smaller than that of the smallest container that is to be gripped. As a result, contact between the gripper arm and the container only occurs at both ends of the holding surface. This makes particularly precise gripping possible.

In other embodiments, the holding surface contacts the container at two places on the holding surface. Among these are embodiments in which the holding surface contacts the container at opposing ends of the holding surface.

Among these embodiments are those in which those in which the gripper is a four-point gripper. Such a gripper contacts the container to be gripped at precisely four points or regions.

The controller causes controlled pivoting of the arms. In some embodiments, the controller extends vertically in the direction of the pivot axis so that it is higher than the arms. Among these are embodiments in which the controller extends over the entire height of the gripper.

In some embodiments, the controller is secured in relation to the other components of the gripper, examples of which include the arms and a housing of the grippe, so that the gripper pivots or rotates about a control axis. In some of these embodiments, the control axis is formed in sections or entirely by a component of the controller, and/or can be in sections or entirely only a geometric axis about which a rotation of the controller is made possible by further components.

In some embodiments, the control axis is configured, at least in sections, as a component, in particular in the region of the securing to a housing component and/or to a holding point, for the purpose of arranging the gripper on a transport device.

Some embodiments include an actuator at one end of the controller that rotates the controller about the control axis. Among these are embodiments in which the actuator is secured directly to the control axis. Among these embodiments are those in which the actuator takes the form of a raised cross that interacts with a drive.

In some embodiments the controller is arranged between the two arms. Among these are embodiments in which the controller extends, at least in sections, in the space between the two arms. The arms lie opposite each other in the same plane and can be pivoted towards one another.

Among these embodiments are those in which the controller is arranged precisely in the middle between the two arms. Also among these embodiments are those in which, during the entire operation of the gripper, the controller is arranged on an angle bisector, which is the line that bisects the angle between the two arms. In some of these embodiments, the control axis of the controller intersects the angle bisector at right angles.

The spring element can in principle be configured as one piece or multiple pieces, of any desired material. In this situation, the gripper comprises at least spring element, preferably at least one spring element per gripper arm pair, and, for very particular preference, precisely one spring element per gripper arm, which for particular preference interacts with precisely one gripper arm. The spring element preferably comprises a helical spring, and for particular preference is formed from at least one helical spring, and for very particular preference from precisely one helical spring. In principle, however, the spring element can comprise, and in particular be, a pneumatic spring, pressure spring, tension spring, or torsion bar spring.

In this situation, the spring element according to the invention can be formed and/or arranged in such a way that it preloads at least one gripper arm towards the other gripper arm, such that, due to the spring force, the arms are moved into a closed position, or are held in the position of holding a container. Accordingly, during the operation of the gripper, a force must be applied so as open the arms and take up a container which counteracts the at least one spring element.

The control roller is a roller which is cylindrical at least in sections and preferably entirely, which is arranged that it can be rotated about a control roller axis at the controller. As an alternative, the rollers can also have a different shape, in particular of the surface which slides and/or rolls on the control face, which is then preferably adjusted to the shape or surface of the inner control faces of the arms. For preference, two of the control rollers, and for particular preference all of them, are formed as identical to one another, and in this situation in particular have the same radius and/or the same height. The at least two control rollers are arranged such as to be able to pivot and/or rotate about the control axis, i.e. in the operation of the gripper the control rollers complete a rotation movement at least in sections about the control axis. Preferably, the control rollers can be pivoted at least by a quarter rotation about the control axis, and for particular preference can be rotated entirely about it. For preference, the control rollers can in this situation be rotatable about their own axes, the control roller axis, whereby this control roller axis of the control rollers is guided rotating about the control axis. The at least two control rollers are therefore preferably movable along a track curve, in particular with a fixed radius, about the control axis.

The inner control face is preferably a section of the surface of the gripper arm, for particular preference the surface facing towards the other gripper arm. According to the invention, the control face in this situation includes a defined shape, which allows for the pivoting of the arms to be controlled by means of the control rollers, sliding and/or rolling on the respective control face. For particular preference, the control faces of the two arms are formed in such a way that both arms open and/or close symmetrically to one another, which in particular is not an obvious result, since the control rollers of the control element roll in opposite directions in relation to the control faces.

The transport device for containers according to the invention, in particular the transport star, comprises a plurality of grippers, in particular a plurality of grippers according to the invention, which are arranged next to one another along a transport direction of the transport device. In this situation, the arrangement of the grippers is preferably in one plane. In some embodiments, the transport device and the transport direction respectively are curved, in particular round. For very particular preference, the transport device comprises grippers arranged next to one another over the entire circumference. In this situation the grippers are for particular preference arranged without any gap to the adjacent gripper, and/or immediately adjacent to one another. In some embodiments, all the grippers of the transport device are configured as identical to one another.

With one advantageous further embodiment of the gripper according to the invention, the inner control face of the arms is formed as a curved and/or angled surface, in such a way that the control roller of the rotating controller, sliding and/or rolling on it, causes a pivoting of the gripper arm between an open and a closed position, as a result of which a particularly uniform and interference-free pivoting of the arms can be achieved. Uniform pivoting is understood in the first instance to be a movement without any abrupt change in the (angular) velocity. In this situation, each of the arms preferably includes only one curving and/or angling of the control face in a direction along the gripper arm and not at right angles to it, or in the axial direction of the gripper arm and/or the control axis.

According to a preferred embodiment of the gripper according to the invention, the inner control face of the gripper arm comprises at least two, and for particular preference precisely two, sections arranged behind one another, wherein the first section preferably extends, in relation to the position of the control axis, along a section of the gripper arm turned towards a gripper arm axis, and/or the second section preferably extends, in relation to the position of the control axis, on a section of the gripper arm which is provided for gripping the container, as a result of which a particularly continuous pivoting of the gripping arms can be achieved without any abrupt changes of speed.

According to an advantageous further embodiment of the gripper according to the invention, secured to the control axis of the controller are two control roller axes, spaced apart from one another, to which the control rollers are secured such as to be able to rotate. In this situation, for very particular preference each of the control roller axes are formed as a component part, while the control axis in the region of the control rollers is only a geometric axis, i.e. the control axis in this region is not formed by a physical component part. For very particular preference, both control roller axes have the same distance interval to the control axis. In some embodiments, the control axis and the two control roller axes are parallel to one another. Also preferred is a configuration of the gripper in which both control roller axes are arranged, in relation to the control axis, opposite one another or are offset by 180° along the circumference about the control axis.

With a preferred further embodiment of the gripper according to the invention, both arms are secured such as to rotate on a common gripper arm axis, which is preferably arranged parallel to the control axis. In some embodiments, the gripper arm axes, like the control axis, are also arranged between the two arms. The arms preferably have a hole or a cut-out opening for the arrangement at the gripper arm axis. In some embodiments the hole or the cut-out opening is arranged at a section of the gripper arm, which in relation to the longitudinal axis of the gripper arm projects at right angles from one end of the gripper arm, or is displaced sideways in relation to the longitudinal axis of the gripper arm. In some embodiments, both arms are configured in such a way that they can be secured at one height in common on a gripper arm axis, and for particular preference both arms have, on opposite sides of the hole or cut-out opening, a cut-out opening to accommodate the gripper arm axis, which allows both arms to be arranged in common at the same height in relation to one another on the gripper arm axis.

With an advantageous further embodiment of the gripper according to the invention, arranged at each of the arms is a spring element for preloading towards the closed position of the gripper arm, as a result of which it is possible, in a particularly simple manner, to achieve preloading of the arms towards the closed position, and thereby achieve an adequately strong gripping effect. As well as this, a preloading towards the closed position ensures that, in the event of a function fault or failed actuation, by means of the controller the container will continue to be held. Preferably, each of the spring elements is arranged at right angles to the gripper arm axis and/or along the longitudinal direction of the gripper arm and/or at right angles to the direction of the pivoting of the gripper arm. In an alterative embodiment, as the spring element, a single pressure spring or tension spring is arranged transversely between the two arms.

A preferred embodiment of the gripper according to the invention makes provision that the gripper arm axis and/or the control axis is secured to a housing component, which preferably comprises a back plate, wherein for particular preference the spring element is secured to the back plate. In this situation, the back plate is preferably a part of the housing component and/or is arranged on an opposite side in relation to the control axis of the position of the arms for gripping the container. In some embodiments, the arms extend only to one side of the back plate, or do not project outwards over the back plate on the side opposite the control axis and/or the gripper arm axis. The housing component is preferably formed as one piece and/or as a bending component made of sheet metal or as an alternative of plastic. In some embodiments, the housing component, and in particular in this situation the back plate, are provided for the arranging of the gripper at a device, in particular at a further component of a container transport star.

According to a preferred embodiment of the gripper according to the invention, the gripper arm comprises a hole to receive one end of the spring element, wherein the hole or the end of the spring element respectively is arranged at a position of the gripper arm of which the distance interval to the back plate or to the other end of the spring element amounts at least to the distance interval of the gripper arm axis from the back plate, as a result of which, on the one hand, a particularly locationally stable securing of the spring element on the gripper arm is attained, and, on the other, the spring effect can be directed with particular precision. For preference, the hole extends along the longitudinal axis of the gripper arm. With an arrangement of the spring element on a surface of the gripper arm, the arrangement is preferably also located at a position of the gripper arm of which the distance interval to the back plate or to the other end of the spring element respectively corresponds at least to the distance interval of the gripper arm axis from the back plate.

With an advantageous further embodiment of the gripper according to the invention, a second pair of arms are arranged underneath the first two arms, wherein both pairs of arms are preferably configured as identical to one another and/or are driven in common by means of one single controller and/or form one fixed module and/or are formed monolithically as one element, as a result of which a particularly secure gripping of the container can be achieved in a simple manner. For preference, the controller comprises two further control rollers, which are arranged at a distance from the first control rollers. In some embodiments, two control rollers are arranged above one another on a common control roller axis. In other embodiments, a spacer element, in particular a spacer sleeve, is arranged between the two control rollers, on a common control roller axis. In still other embodiments, at least two arms in each case, and for particular preference all the arms are secured such as to be capable of pivoting on a common gripper arm axis.

In some embodiments, all the pairs of arms are arranged exactly above one another. In other embodiments, the pivoting of the arms of all the pairs of arms of the gripper takes place entirely in synchrony, for as long as the arms are not yet in contact with a container.

A particularly advantageous embodiment of the gripper according to the invention makes provision that at least the controller and/or the housing component of the gripper, and preferably the entire gripper, is or are configured as symmetrical, in particular mirror-symmetrical, in such a way that the gripper can be operated with one side of the control axis pointing in one direction, but also with this side of the control axis facing in the opposite direction, for which purpose, for particular preference, a control cross is in each case arranged on both sides of the control axis. For very particular preference, in this situation at least the position of the two control crosses are symmetrical to one another in relation to a holding device or an intended position of the gripper, in particular at the back plate and/or at the housing component, for securing to a transport device.

A particularly preferred further embodiment of the transport device makes provision for the arms of the grippers to be formed in such a way that in each case the adjacent arms of adjacent grippers, in particular in the opened position, can partially be pivoted above one another or past one another, such that the arms pivot at least partially above one another or below one another, cross over, or can be moved inside a common section of the transport device independently of one another, as a result of which a particularly compact structure is attained and the best possible utilization of space along the circumference of the transport device.

With a preferred embodiment of the transport device, the individual grippers are configured in such a way that, with two grippers arranged next to one another at the transport device, rotated by 180° in relation to one another, the arms can in each case be pivoted above one another or into a gap in the arms of the adjacent gripper, in particular in the opened position of the arms. This is particularly advantageous with grippers with at least two gripper arm pairs arranged at a distance above one another. An arrangement of the grippers rotated by 180° is understood to be an arrangement with which one of the two grippers has been rotated by half a revolution in relation to the orientation of the other gripper about an axis along the longitudinal axis of the arms, and/or orthogonally to the control axis.

According to an advantageous further embodiment of the transport device according to the invention, a carrier surface is provided, on which a container which is to be transported can stand upright with its base on at least a part section of the transport path. In this situation, the carrier surface extends at least in sections, and preferably entirely, beneath a track, along which the individual grippers of the transport device can be moved. Preferably, the distance interval between the carrier surface and the gripper remains constant.

A preferred configuration of the transport device makes provision for the carrier surface to be fixed and not circulating in the transport direction, wherein the container can be guided by sliding or slipping on the surface. For this purpose the carrier surface for particular preference includes a smooth and/or flat surface.

As an alternative, an embodiment of the transport device is preferred with which the carrier surface is secured circulating at the transport device, wherein the container and the carrier surface can be moved circulating at the same speed.

BRIEF DESCRIPTION OF THE FIGURES

An exemplary embodiment of the gripper according to the invention is explained in greater detail hereinafter by reference to the drawings. The figures show.

DETAILED DESCRIPTION

Figure 1:
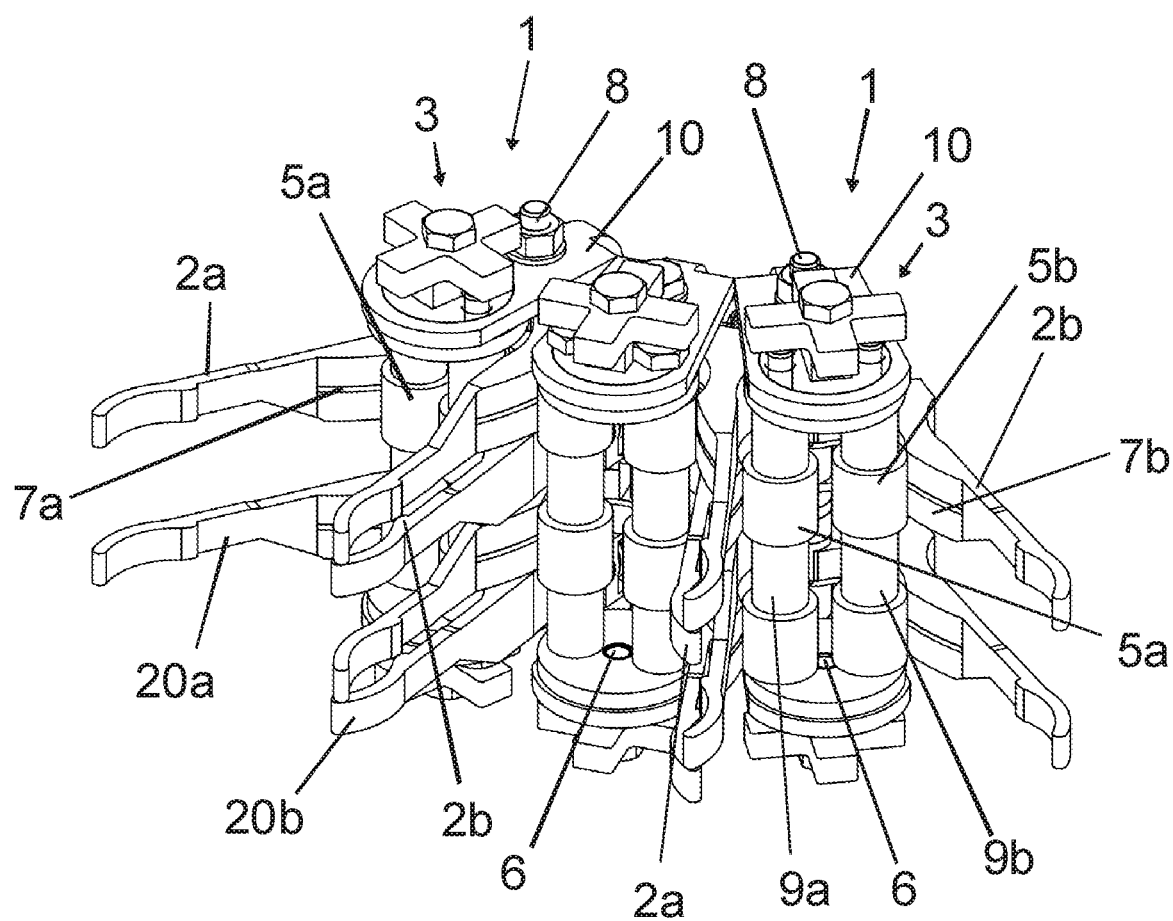
FIG. 1 shows three grippers arranged along a transport star.

FIG. 1 shows three grippers 1 arranged next to each other along a transport star that transports bottles. Each gripper 1 includes first and second pairs of arms 2a, 2b, 20a, 20b, all of which pivot around a common arm axis 8, best seen in FIG. 2.

Figure 2:
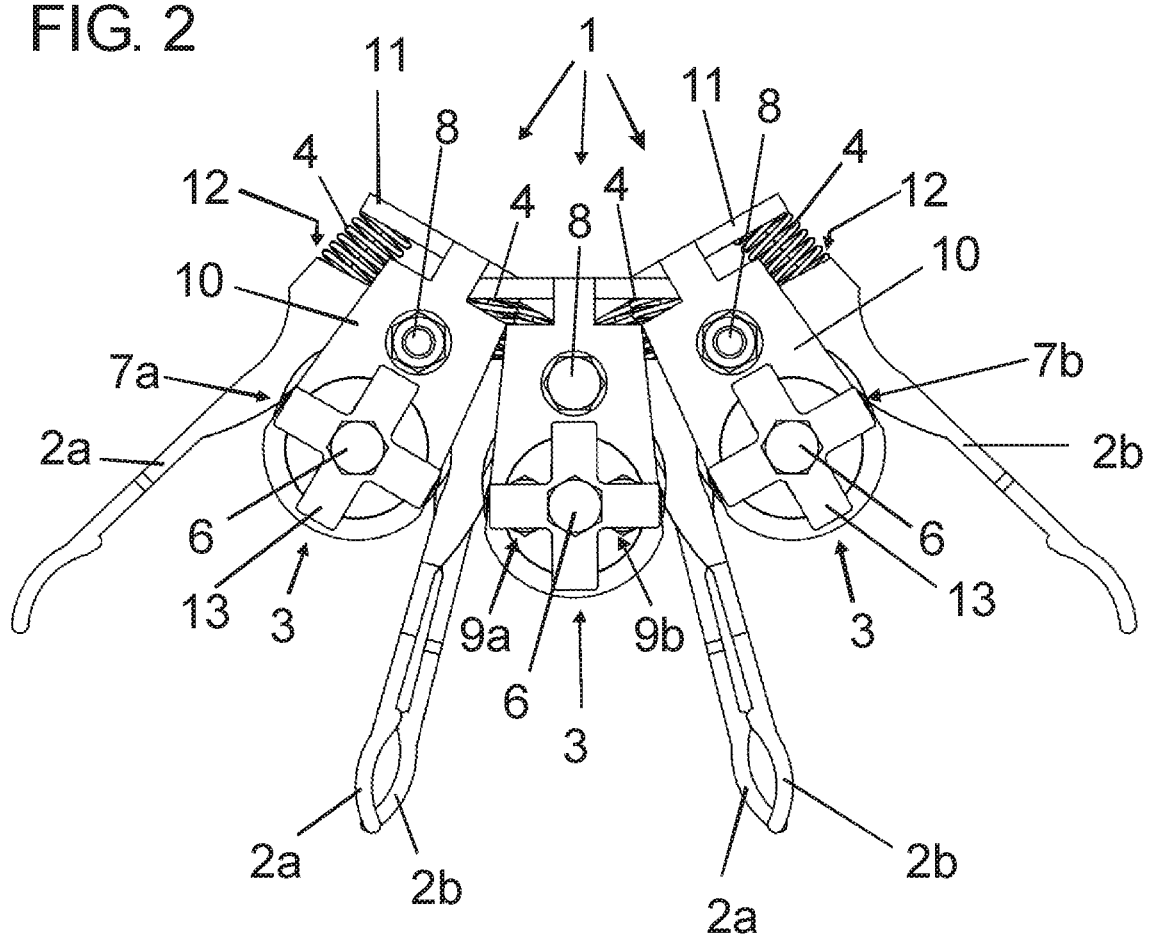
FIG. 2 is a top view of the grippers shown in FIG. 1.
Figure 3:
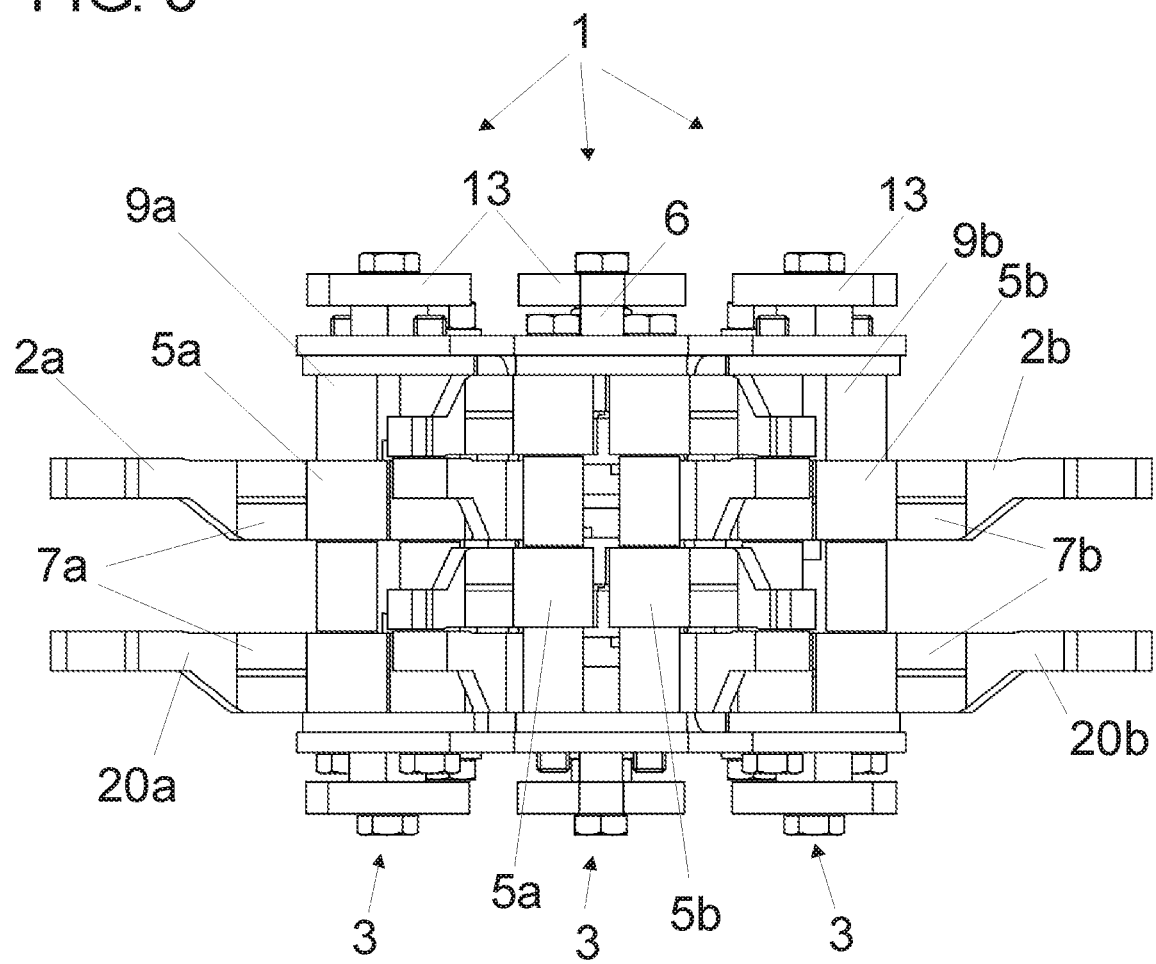
FIG. 3 is a front view of the grippers shown in FIG. 1.
Figure 4:
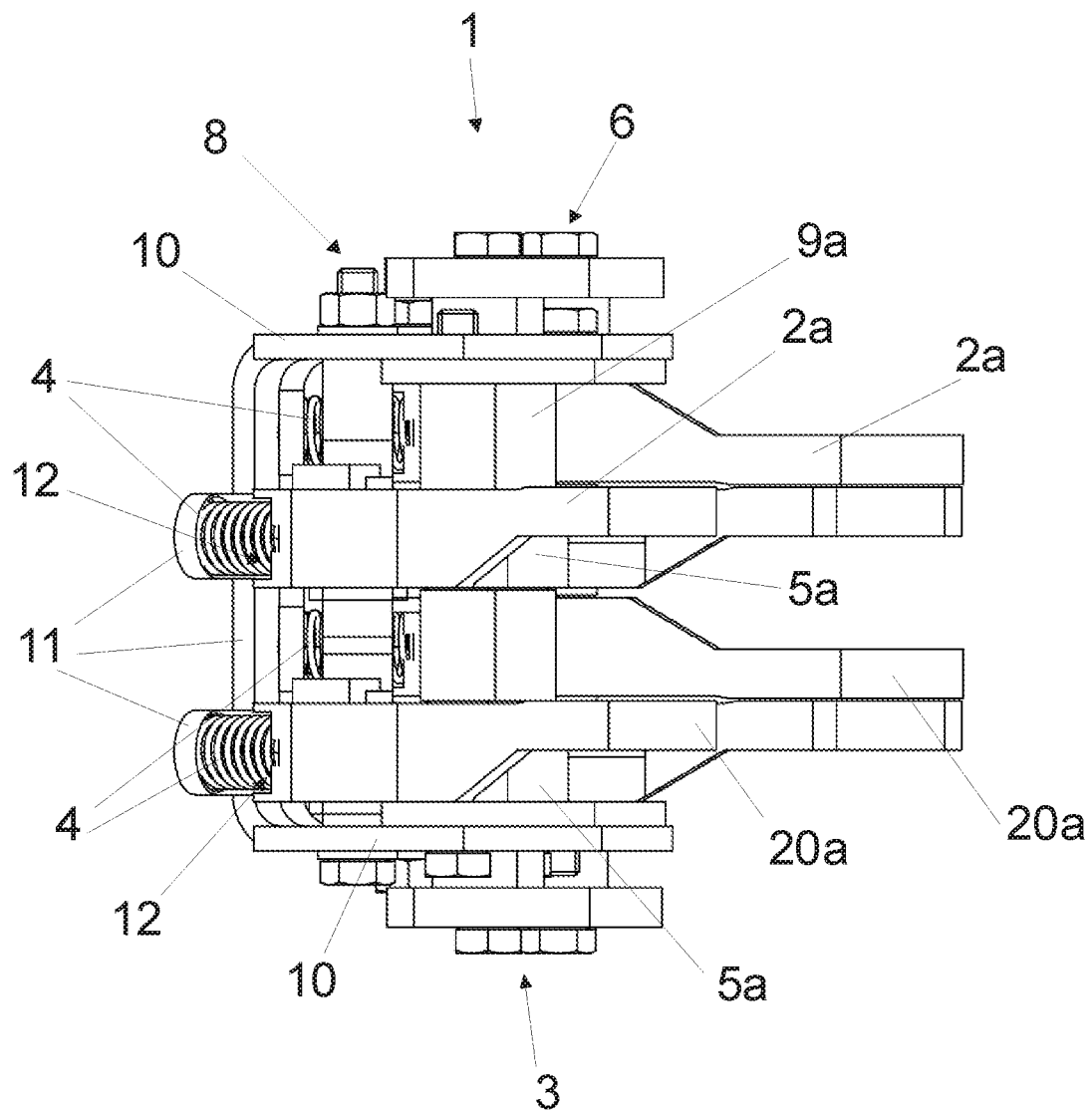
FIG. 4 is a side view of the grippers shown in FIG. 1.

The gripper 1 is secured to a housing 10 having a back plate 11, best seen in FIG. 2. The back plate 11 secures the gripper 1 to a transport star or to a frame of a transport star.

Between each pair of arms 2a, 2b, 20a, 20b is an associated controller 3 that is secured to the housing 10 to permit rotation about a corresponding control axis 6 thereof by an angle close to 360 degrees. At each end of the control axis 6 is a control cross 13 that is secured to the gripper 1.

For each pair of arms 2a, 2b, 20a, 20b, there exists a spring 4 that preloads the arms 2a, 2b, 20a, 20b, thus urging the gripper 1 to remain closed. The spring 4, which is typically a helical spring, has a first end and a second end. The spring's first end is secured to the back plate 11. The spring's second end is secured in a hole 12 that extends along a gripper arm's longitudinal axis.

As shown in FIG. 1, the arms 2a, 2b, 20a, 20b are arranged at different heights so that they can cross over one another without interference when pivoted outward as the gripper transitions into its open position. As a result, it is possible to arrange the arms 2a, 2b, 20a, 20b to be particularly close to each other.

The controller 3 includes parallel first and second roller axes 9a, 9b that are disposed at equal distances on other side of the control axis 6. Rotating the controller 3 about this control axis 6 causes the roller axes 9a, 9b to move on a common track along a curved path around the control axis 6.

Each roller axis 9a, 9b includes a corresponding control roller 5a, 5b disposed at the height of its corresponding gripper arm 2a, 2b, 20a, 20b so as to roll or slide along a corresponding control face 7a, 7b of the gripper arm 2a, 2b, 20a, 20b as the roller axis 9a, 9b moves in response to rotation of the controller 3. In doing so, the roller 5a, 5b exerts a force on the arm 2a, 2b, 20a, 20b that counteracts that exerted by the spring 4. As a result, the arms 2a, 2b, 20a, 20b pivot.

Figure 5:
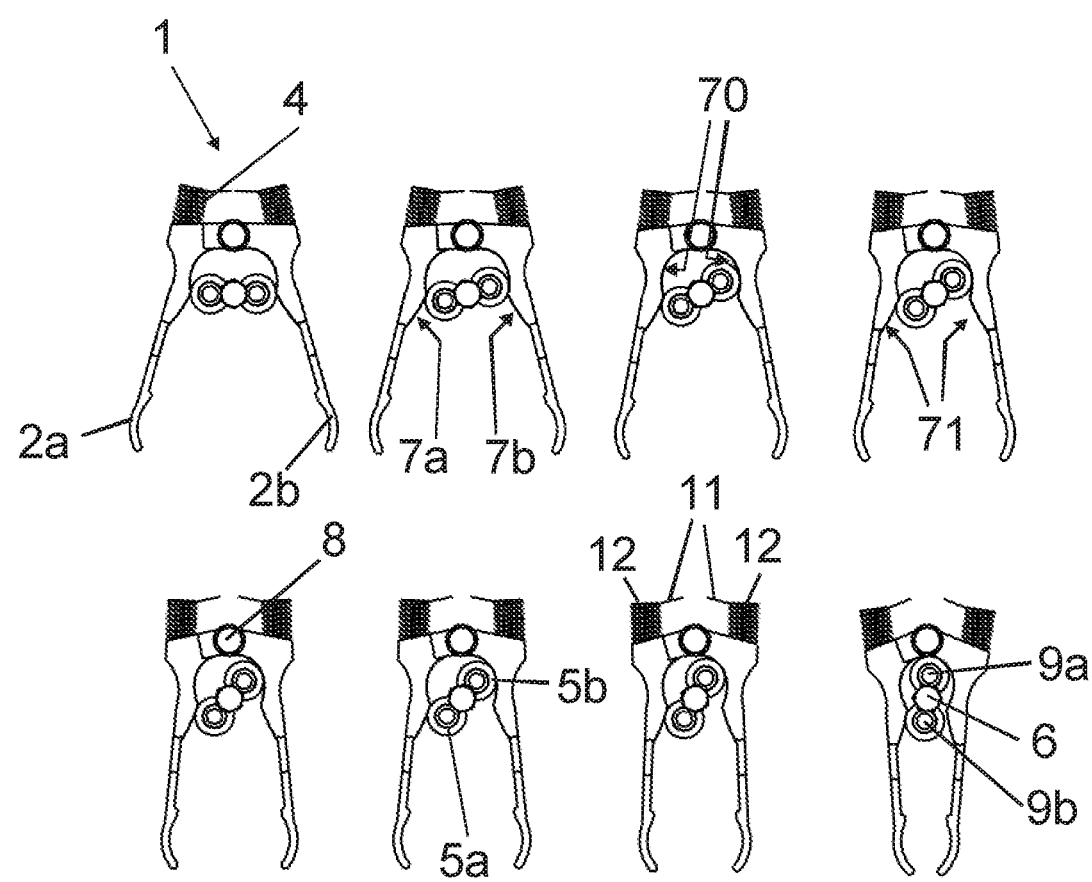
FIG. 5 shows stages in the operation of one of the grippers shown in FIG. 1.

To ensure that the arms 2a, 2b, 20a, 20b belonging to the same pair pivot symmetrically regardless of the direction of the pivot, the control faces 7a, 7b have mirror symmetry. In addition, each control face 7a, 7b has proximal section 70 and a distal section 71 that adjoin each other, as shown in FIG. 5.

The proximal section 70 has a uniform curvature along a path that goes around the control axis 6. The distal section 71 has a much smaller curvature than the proximal section 70, so much so that it is almost linear. As a result, the distance between faces 7a, 7b of the arms 2a, 2b, 20a, 20b increases along the distal direction of the gripper arm 2a, 2b, 20a, 20b.

A gripper 1 transitions from being open to receive a container and being closed to grip the container. FIG. 5 shows steps in a gripper's transition from being open to being closed.

Rotating the controller 3 places the gripper 1 in its open position. It does so by moving the first and second rollers 5a, 5b so that they contact the boundary between the proximal and distal sections 70, 71. The rollers 5a, 5b thus lie along a line that is perpendicular to a bisecting line. This bisecting line is midway between the two arms 2a, 2b, 20a, 20b. Additionally, the helical springs 4 of the arms 2a, 2b, 20a, 20b attain their maximum compression.

Starting from the above open position, rotating the controller 3 through a right angle places the gripper 1 into its closed position. In the closed position, one control roller 5a rolls into position on the distal section 71 and the other control roller 5b rolls into position on the proximal section 70.

In this closed position, the rollers 5a, 5b lie along the bisecting line. Each roller 5a, eb contacts the control faces 7a, 7b of both arms 2a, 2b, 20a, 20b. The distalmost roller in the closed position contacts the distal sections 71 of both faces 7a, 7b and the proximal-most roller contacts the proximal sections 70 of both control faces 7a, 7b.

During the transition from the open state to the closed state, the control rollers 5a, 5b resist the spring's force, thus providing a guided and controlled closure of the arms 2a, 2b, 20a, 20b against the spring force. Once the gripper is in its closed state, it can be reopened by rotating the control axis 6 through a right angle in either the clockwise or counterclockwise direction.

The invention claimed is:

1. An apparatus comprising a gripper for a container-transport system, said gripper comprising a first pair of arms, a controller, a spring, and first and second rollers, wherein said first pair of arms comprises a first arm that comprises a first face formed thereon and a second arm that comprises a second face formed thereon, wherein said controller is disposed between said first and second arms, wherein said controller pivots said first and second arms towards one another, wherein said spring pre-loads said first and second arms towards each other, wherein said first and second rollers are arranged at said controller and rotate about a central control-axis thereof, wherein, for pivoting said first arm, said controller guides movement of said first roller along said first face, wherein, for pivoting said second arm, said controller guides movement of said second roller along said second face, wherein said first and second faces are shaped such that, in response to movement of said first and second rollers, said first and second arms carry out an equiangular and symmetric pivoting between an opened and closed position of said gripper, wherein said first and second arms are gripper arms, wherein said first and second rollers are control rollers, wherein said controller is a rotatable control unit, wherein said first and second faces are inner control faces, and wherein movement along said first face is selected from said group consisting of sliding and rolling.

2. The apparatus of claim 1, wherein each of said faces comprises a proximal section and a distal section, wherein said distal section is closer than said proximal section to where a container is gripped.

3. The apparatus of claim 1, wherein said first face has a first curvature at a proximal section thereof and a second curvature at a distal section thereof, wherein said distal section is closer to being linear than said proximal section.

4. The apparatus of claim 1, further comprising first and second roller axes, wherein said first roller rotates when said first roller axis rotates and said second roller rotates when said second roller axis rotates.

5. The apparatus of claim 1, further comprising first and second roller axes arranged on opposite sides of said central control-axis.

6. The apparatus of claim 1, further comprising a common arm axis that is parallel to said central control-axis, wherein said arms are secured to pivot about said common arm-axis.

7. The apparatus of claim 1, wherein said gripper further comprises a housing that comprises a back plate, wherein said spring is secured to said back plate.

8. The apparatus of claim 1, wherein said spring comprises a proximal end and a distal end, wherein said proximal end is attached to a back plate of a housing of said gripper, wherein a hole in one of said arms receives said distal end, wherein a first distance is a distance between said back plate and said distal end, wherein a second distance is a distance between said back plate and a common arm axis that is parallel to said central control-axis and about which said arms pivot during operation of said gripper, and wherein said first and second distances are equal.

9. The apparatus of claim 1, wherein said gripper comprises third and fourth arms that form a second pair of arms, said third and fourth arms being identical to said first and second arms.

10. The apparatus of claim 1, wherein said gripper comprises a second pair of arms and said controller operates said first and second pairs of arms concurrently.

11. The apparatus of claim 1, wherein said gripper comprises third and fourth arms and wherein said first, second, third, and fourth arms are formed monolithically as a single element.

12. The apparatus of claim 1, wherein said gripper comprises a module that comprises said first pair of arms and a second pair of arms.

13. The apparatus of claim 1, further comprising a first control cross arranged on a first end of said control axis and a second control cross arranged on a second end of said control axis.

14. The apparatus of claim 1, further comprising a transporter for transporting containers, wherein said gripper is one of a plurality of grippers on said transporter, said grippers being disposed along a direction along which said transporter transports containers.

15. The apparatus of claim 1, wherein said first arm pivots in a first plane and an arm of an adjacent gripper pivots in a second gripper parallel to and offset from said first plane so as not to interfere with pivoting of said first arm.

16. The apparatus of claim 1, wherein said gripper is a first gripper and said apparatus comprises a second gripper that is adjacent to said first gripper, wherein said second gripper is rotated 180 degrees relative to said first gripper, wherein when said first arm and a first arm of said second gripper pivots concurrently, said first arm and said first arm of said second gripper are vertically offset from each other.

17. The apparatus of claim 1, wherein said gripper is tooth-free.

18. A method comprising receiving a container in a gripper, said gripper comprising first and second arms having corresponding first and second faces formed therein and a controller disposed between said arms for pivoting said arms towards each other, said arms being pre-loaded by a spring, wherein first and second rollers are arranged at said controller and rotate about a central control axis thereof, wherein pivoting each of said gripper arms comprises causing said controller to guide movement of said rollers along said faces, said faces being shaped such that, in response to movement of said first and second rollers, said first and second arms carry out an equiangular and symmetric pivoting between an opened and closed position of said gripper, wherein said first and second arms are gripper arms, wherein said first and second rollers are control rollers, wherein said controller is a rotatable control unit, wherein said first and second faces are inner control faces, and wherein movement along said first face is selected from the group consisting of sliding and rolling, said method comprising opening said first and second arms, receiving container between said first and second arms, and closing said first and second arms, wherein opening said first and second arms comprises causing a first rotation to move said first and second rollers along said first and second faces, thus overcoming a closing force from said spring to open said gripper, wherein closing said first and second arms comprises causing a second rotation, thereby permitting said controller to guide movement of said rollers along said first and second faces under said influence of said spring, which urges said arms into a closed position to close said gripper, and wherein said first and second rotations are rotations of ninety degrees.

* * * * *